US011760457B2

(12) United States Patent
Pendergraft

(10) Patent No.: US 11,760,457 B2
(45) Date of Patent: *Sep. 19, 2023

(54) TROLLING MOTOR FOOT PEDAL CONTROLLED SONAR DEVICE

(71) Applicant: Navico, Inc., Tulsa, OK (US)

(72) Inventor: Dustyn P. Pendergraft, Claremore, OK (US)

(73) Assignee: Navico, Inc., Tulsa, OK (US)

(*) Notice: Subject to any disclaimer, the term of this patent is extended or adjusted under 35 U.S.C. 154(b) by 230 days.

This patent is subject to a terminal disclaimer.

(21) Appl. No.: 17/371,192

(22) Filed: Jul. 9, 2021

(65) Prior Publication Data
US 2023/0011068 A1 Jan. 12, 2023

(51) Int. Cl.
*B63H 20/12* (2006.01)
*B63B 79/10* (2020.01)
*G01S 7/521* (2006.01)
*G05D 1/02* (2020.01)

(52) U.S. Cl.
CPC ............. *B63H 20/12* (2013.01); *B63B 79/10* (2020.01); *G01S 7/521* (2013.01); *G05D 1/0206* (2013.01)

(58) Field of Classification Search
CPC ......... B63H 20/12; B63B 79/10; G01S 7/521; G05D 1/0206
See application file for complete search history.

(56) References Cited

U.S. PATENT DOCUMENTS

| 2,877,733 A | 3/1959 | Harris |
| 3,598,947 A | 8/1971 | Osborn |
| 3,807,345 A | 4/1974 | Peterson |
| 4,824,408 A * | 4/1989 | Aertker ............... B63H 20/007 318/16 |

(Continued)

FOREIGN PATENT DOCUMENTS

| EP | 2 602 639 A1 | 6/2013 |
| EP | 1 891 461 B1 | 5/2014 |

(Continued)

OTHER PUBLICATIONS

Jun. 12, 2022, Extended European Search Report issued in European Patent Application No. 22183815.4.

(Continued)

*Primary Examiner* — Stephen P Avila
(74) *Attorney, Agent, or Firm* — Nelson Mullins Riley Scarborough LLP

(57) ABSTRACT

Example steering control systems for multiple devices are provided herein. A system includes a trolling motor assembly having a propulsion motor and a steering actuator and a sonar assembly comprising a transducer assembly and a directional actuator. The system further includes a user input assembly that is configured to detect user activity related to controlling operation of the trolling motor assembly and operation of the sonar assembly. The system further includes a processor that is configured to determine a direction of turn based on user activity, generate an electrical turning input signal indicating the direction of turn, and direct one of the steering actuator and the directional actuator, via the turning input signal, to rotate one of the propulsion motor and the transducer assembly, respectively, in a direction of turn based on the turning input signal.

18 Claims, 8 Drawing Sheets

(56) References Cited

U.S. PATENT DOCUMENTS

| | | |
|---|---|---|
| 5,293,351 A | 3/1994 | Noponen |
| 5,420,828 A | 5/1995 | Geiger |
| 5,892,338 A | 4/1999 | Moore et al. |
| 6,054,831 A | 4/2000 | Moore et al. |
| 6,181,644 B1 | 1/2001 | Gallagher |
| 6,325,684 B1 | 12/2001 | Knight |
| 6,447,347 B1 | 9/2002 | Steinhauser |
| 6,504,794 B2 | 1/2003 | Haase et al. |
| 6,507,164 B1 | 1/2003 | Healey et al. |
| 6,524,144 B2 | 2/2003 | Pasley |
| 6,661,742 B2 | 12/2003 | Hansen |
| 6,678,589 B2 | 1/2004 | Robertson et al. |
| 6,868,360 B1 | 3/2005 | Olstad et al. |
| 6,870,794 B2 | 3/2005 | Healey |
| 6,902,446 B1 | 6/2005 | Healey |
| 6,909,946 B1 | 6/2005 | Kabel et al. |
| 6,919,704 B1 | 7/2005 | Healey |
| 7,004,804 B2 | 2/2006 | Bernloehr et al. |
| 7,190,636 B1 | 3/2007 | Depaola |
| 7,195,526 B2 | 3/2007 | Bernloehr et al. |
| 7,268,703 B1 | 9/2007 | Kabel et al. |
| 7,303,595 B1 | 12/2007 | Janitz |
| 7,371,218 B2 | 5/2008 | Walston et al. |
| 7,430,461 B1 | 9/2008 | Michaels |
| 7,452,251 B2 | 11/2008 | Boebel |
| 7,538,511 B2 | 5/2009 | Samek |
| D594,034 S | 6/2009 | Bernloehr et al. |
| 7,542,376 B1 | 6/2009 | Thompson et al. |
| 7,633,431 B1 | 12/2009 | Wey |
| 7,722,417 B2 | 5/2010 | Bernloehr et al. |
| 8,106,617 B1 | 1/2012 | Holley |
| 8,195,084 B2 | 6/2012 | Xiao |
| 8,221,175 B2 | 7/2012 | Mynster |
| 8,305,844 B2 | 11/2012 | DePasqua |
| 8,645,012 B2 | 2/2014 | Salmon et al. |
| 8,761,976 B2 | 6/2014 | Salmon et al. |
| 8,814,129 B2 | 8/2014 | Todd et al. |
| 8,879,359 B2 | 11/2014 | DePasqua |
| 8,888,065 B2 | 11/2014 | Logan |
| 8,896,480 B1 | 11/2014 | Wilson et al. |
| 8,991,280 B2 | 3/2015 | Wireman |
| 9,127,707 B1 | 9/2015 | Huntley |
| 9,132,900 B2 | 9/2015 | Salmon et al. |
| 9,135,731 B2 | 9/2015 | Lauenstein et al. |
| 9,160,210 B2 | 10/2015 | Perry |
| 9,162,743 B1 | 10/2015 | Grace et al. |
| 9,201,142 B2 | 12/2015 | Antao |
| 9,278,745 B2 | 3/2016 | Kooi, Jr. et al. |
| 9,290,256 B1 | 3/2016 | Wireman et al. |
| 9,296,455 B2 | 3/2016 | Bernloehr et al. |
| 9,322,915 B2 | 4/2016 | Betts et al. |
| 9,394,040 B2 | 7/2016 | Grace et al. |
| 9,459,350 B2 | 10/2016 | Betts et al. |
| 9,505,477 B2 | 11/2016 | Grace et al. |
| 9,507,562 B2 | 11/2016 | Bailey |
| 9,594,375 B2 | 3/2017 | Jopling |
| 9,596,839 B2 | 3/2017 | Bailey |
| 9,676,462 B2 | 6/2017 | Bernloehr et al. |
| 9,746,874 B2 | 8/2017 | Johnson et al. |
| 9,758,222 B2 | 9/2017 | Grace et al. |
| 9,836,129 B2 | 12/2017 | Clark |
| 10,025,312 B2 | 7/2018 | Langford-Wood |
| 10,061,025 B2 | 8/2018 | Kirmani |
| 10,114,119 B2 | 10/2018 | Horner et al. |
| 10,114,470 B2 | 10/2018 | Clark |
| 10,241,200 B2 | 3/2019 | Sayer et al. |
| 10,247,823 B2 | 4/2019 | Brown et al. |
| 10,311,715 B2 | 6/2019 | Jopling |
| 10,324,175 B2 | 6/2019 | Laster |
| 10,451,732 B2 | 10/2019 | Laster |
| 10,460,484 B2 | 10/2019 | Hovland et al. |
| 2003/0191562 A1 | 10/2003 | Robertson et al. |
| 2003/0203684 A1 | 10/2003 | Healey |
| 2003/0214483 A1 | 11/2003 | Hammer et al. |
| 2005/0255761 A1 | 11/2005 | Bernloehr et al. |
| 2006/0116031 A1 | 6/2006 | Bernloehr et al. |
| 2009/0037040 A1 | 2/2009 | Salmon et al. |
| 2009/0227158 A1 | 9/2009 | Bernloehr et al. |
| 2012/0014220 A1 | 1/2012 | DePasqua |
| 2012/0015566 A1 | 1/2012 | Salmon |
| 2012/0060733 A1 | 3/2012 | Maki et al. |
| 2012/0204467 A1 | 8/2012 | Palmer et al. |
| 2012/0232719 A1 | 9/2012 | Salmon et al. |
| 2012/0299764 A1 | 11/2012 | Haneda et al. |
| 2013/0044569 A1 | 2/2013 | DePasqua |
| 2013/0215719 A1 | 8/2013 | Betts et al. |
| 2014/0203162 A1 | 7/2014 | Logan |
| 2014/0249698 A1 | 9/2014 | Salmon et al. |
| 2014/0269164 A1 | 9/2014 | Betts et al. |
| 2014/0277851 A1 | 9/2014 | Grace et al. |
| 2014/0336854 A1 | 11/2014 | Salmon et al. |
| 2015/0016130 A1 | 1/2015 | Davis et al. |
| 2015/0063059 A1 | 3/2015 | DePasqua |
| 2015/0063060 A1 | 3/2015 | DePasqua |
| 2015/0151824 A1 | 6/2015 | Wireman |
| 2015/0346729 A1 | 12/2015 | Grace et al. |
| 2016/0016651 A1 | 1/2016 | Anderson et al. |
| 2016/0253150 A1 | 9/2016 | Williams et al. |
| 2017/0038460 A1 | 2/2017 | Clark |
| 2017/0285167 A1 | 10/2017 | Proctor et al. |
| 2017/0371039 A1 | 12/2017 | Clark et al. |
| 2018/0244361 A1 | 8/2018 | Laster |
| 2018/0288990 A1 | 10/2018 | Laster et al. |
| 2018/0329056 A1 | 11/2018 | Smith et al. |
| 2018/0365246 A1 | 12/2018 | Laster et al. |
| 2019/0072951 A1 | 3/2019 | Clark et al. |
| 2019/0176952 A1 | 6/2019 | Clark et al. |
| 2019/0176953 A1 | 6/2019 | Clark et al. |
| 2019/0331779 A1 | 10/2019 | Sandretto |
| 2020/0070943 A1 | 3/2020 | Clark et al. |
| 2020/0272152 A1 | 8/2020 | Combs |
| 2021/0056944 A1 | 2/2021 | Vance |
| 2021/0371074 A1 | 12/2021 | Lammers-Meis |

FOREIGN PATENT DOCUMENTS

| | | |
|---|---|---|
| EP | 3663888 A1 | 6/2020 |
| GB | 2 421 312 A | 6/2006 |
| WO | WO 95/28682 A1 | 10/1995 |
| WO | WO 2013/126761 A1 | 8/2013 |
| WO | WO 2014/144471 A1 | 9/2014 |

OTHER PUBLICATIONS

"Minn Kota Riptide ST Foot Pedal Accessory User Manual;" retrieved Dec. 7, 2017 from file:///C:/Users/PForbes/Downloads/2377123rc_RT_ST_Foot_Pedal_Manual.pdf.; 4 pages.

"Bass Resource The Ultimate Bass Fishing Resource Guide: Bass Fishing Forums"Trolling Motor Foot Pedal—Do You Mount to Deck?; retrieved Dec. 8, 2017 from https://www.bassresource.com/bass-fishing-forums/topic/190825-trolling-motor-foot-pedal-do-you-mount-to-deck/.

Shepardson; "Google wins U.S. approval for new radar-based motion sensor;" Reuters; Jan. 1, 2019; retrieved Feb. 13, 2020 from https://www.reuters.com/article/us-google-sensor/google-wins-u-s-approval-for-radar-based-hand-motion-sensor-idUSKCN1OVISH.

Feldler; "Teaching With NYT Virtual Reality Across Subjects;" The New York Times; Mar. 28, 2019; retrieved Feb. 13, 2020 from https://www.nytimes.com/2019/03/28/learning/lesson-plans/teaching-with-nyt-virtual-reality-across-subjects.html.

Smolan et al; "The Click Effect;" New York Times VR; retrieved Feb. 13, 2020 from https://www.with.in/watch/CnVHWFg.

Porathe; "3-D Nautical Charts and Safe Navigation;" Department of Innovation, Design and Product Development; Doctoral Dissertation No. 27, Mälardalen University; Jan. 1, 2006; pp. 1-307 (XP055119720).

U.S. Appl. No. 16/791,335 entitled "Systems and Methods for Controlling Operations of Marine Vessels;" filed Feb. 14, 2020 in the name of Kristopher C. Snyder et al.

U.S. Appl. No. 17/326,409 entitled "Sonar Steering Systems and Associated Methods;" filed May 21, 2021 in the name of Christopher D. Crawford et al.

(56) References Cited

OTHER PUBLICATIONS

"LiveSweep (Wired or Wireless Pedal) Mounting Hardware Included;" *Cornfield Crappie Gear*; retrieved Jul. 19, 2021 from https://www.cornfieldcrapplegear.com/product-page/livesweep-wired-pedal-mounting-hardware-included.
"Google Glass;" *Wikipedia*; retrieved Apr. 18, 2013 from http://en.wikipedia.org/wiki/Google_Glass.
"Navico set to GoFree"; May 1, 2012; retrieved Apr. 18, 2013 from http://www.marinebusiness.com.au/archive/navico-set-to-gofree.
Jun. 16, 2014 Search Report and Written Opinion issued in International Patent Application No. PCT/US2014/021133.
"Motor Guide Xi5 Wireless Foot Pedal;" retrieved Dec. 7, 2017 from http://www.motorguide.com/store/accessory/xi5-wireless-foot-pedal0.
"Magic Leap Quick Start Guide;" 2018; retrieved Feb. 13, 2020 from https://assets.ctfassets.net/bl73eiperqoo/4H4PJgU9C0GySyie4QeuWE/c7ef230a10147e86173dd9250ce5b064/180606_QSG_277x190mm_PANTONE_v1.pdf.
*Cornfield Crappie Gear*; retrieved Jul. 19, 2021 from https://www.cornfieldcrappiegear.com/.

\* cited by examiner

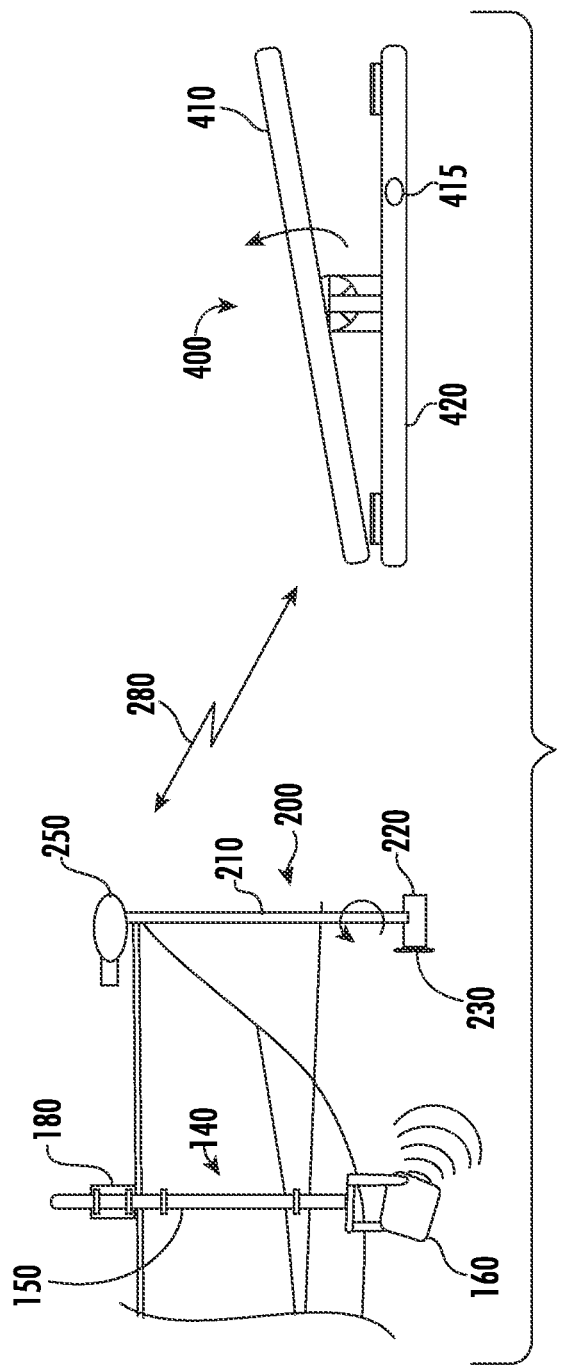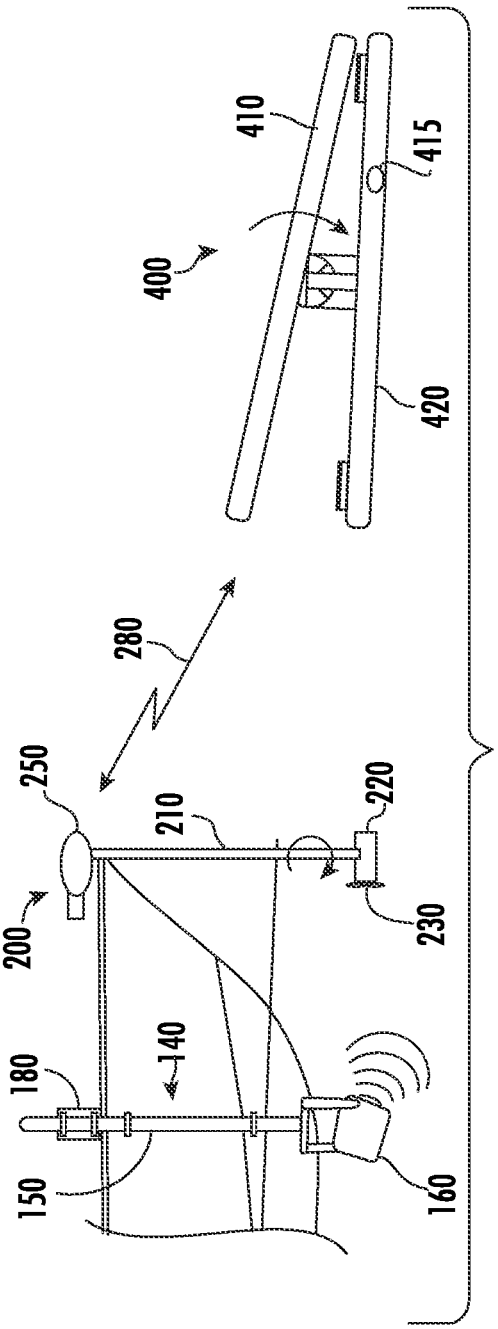

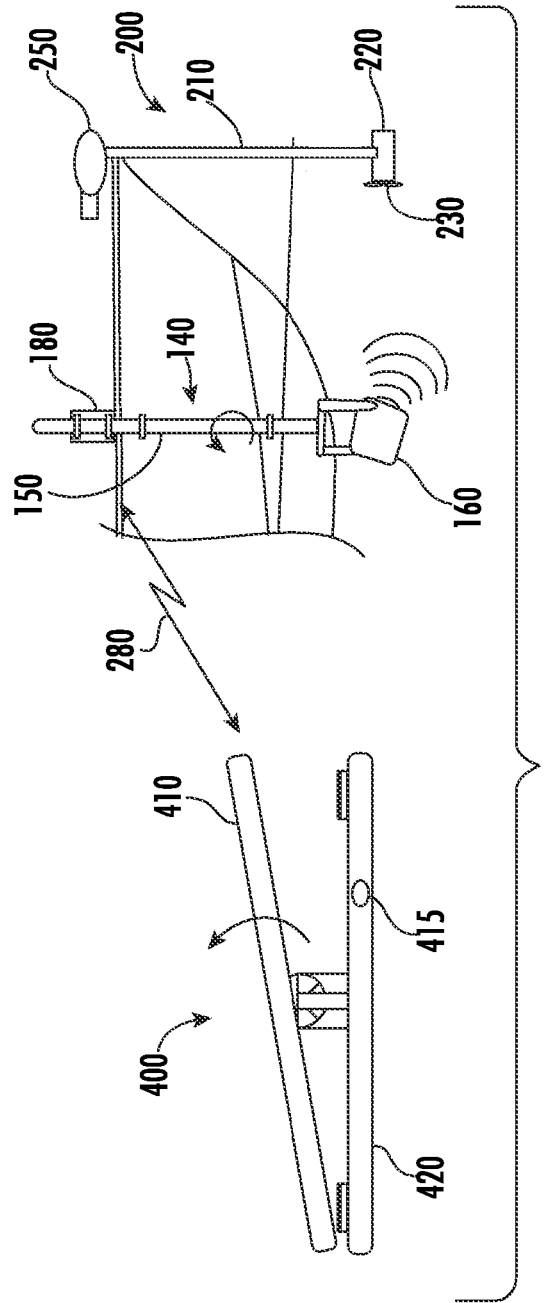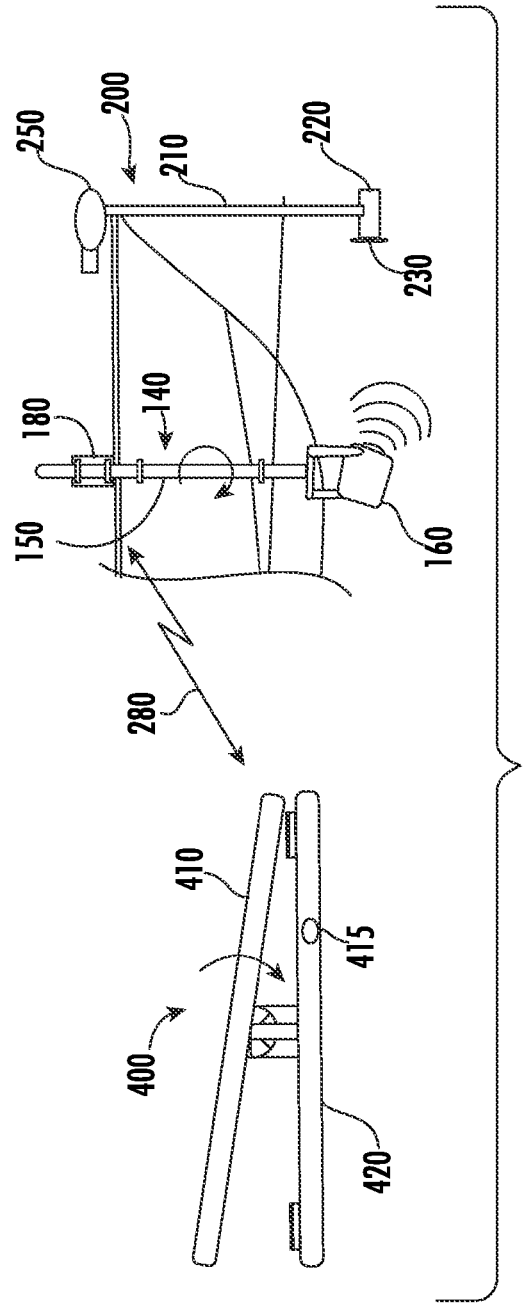
FIG. 7A
FIG. 7B

TROLLING MOTOR FOOT PEDAL CONTROLLED SONAR DEVICE

FIELD OF THE INVENTION

Embodiments of the present invention relate generally to marine technology and, more particularly, to marine sonar and propulsion systems.

BACKGROUND OF THE INVENTION

Both trolling motors and sonar (SOund Navigation and Ranging) systems are often used during fishing or other marine activities. Trolling motors attach to the watercraft and propel the watercraft along a body of water. Often, trolling motors may provide secondary propulsion for precision maneuvering that can be ideal for fishing activities. Trolling motors offer benefits in the areas of ease of use and watercraft maneuverability, among others. Sonar systems are used to detect waterborne or underwater objects. For example, sonar devices may be used to determine depth and bottom topography, detect fish, locate wreckage, etc. In this regard, due to the extreme limits to visibility underwater, sonar is typically the most accurate way to locate objects underwater and provide an understanding of the underwater environment. That said, further innovation with respect to the operation of both trolling motors and sonar systems, particularly in the area of simplifying the ease of use, is desirable.

BRIEF SUMMARY OF THE INVENTION

According to various example embodiments, a system including a trolling motor assembly, a sonar system, and a navigation control device is provided for simplified operations by a single navigation control device.

Conventional trolling motor systems employ a navigation control device that, in response to user activity (e.g., through interaction with the navigation control device such as by depressing a foot pedal or pressing a button on a fob), electronically controls both the direction and speed of the propulsion system (e.g., the propeller and motor assembly). Similarly, conventional directionally-enabled sonar systems may include a separate control device that, in response to user activity, electronically controls the direction in which a transducer assembly of the sonar system is directed with respect to the watercraft. In this manner, a user is able to direct the "picture" (or image) of the underwater environment to the desired location relative to the watercraft. Typical navigation and sonar control devices may be connected to the associated propulsion and sonar systems by cables for the transmission of control signals thereto. Watercraft often have limited deck space, and the use of multiple control devices and their associated cabling can contribute to clutter and, therefore, reduced safety on the watercraft. Various embodiments described herein are directed to electronically controlled trolling motor assemblies and sonar systems that utilize a single control device, thereby reducing the amount of equipment required on the deck of a watercraft. Further, the known nature of use of the foot pedal can be leveraged for directional control of the sonar system. Additionally or alternatively, such a single user input assembly may be used to control other operations on the watercraft.

According to some example embodiments, an example system comprises a trolling motor assembly comprising a propulsion motor and a steering actuator. The steering actuator is configured to rotate a direction of the propulsion motor in response to an electrical signal. The system further includes a sonar assembly comprising a transducer assembly and a directional actuator. The directional actuator is configured to rotate a direction of the transducer assembly in response to an electric signal. The system further includes a user input assembly. The user input assembly is configured to detect user activity related to at least one of either controlling the direction of the propulsion motor of the trolling motor assembly or the direction of the transducer assembly of the sonar assembly. The system further includes a processor, the processor configured to: determine a direction of turn based on the user activity detected by the user input assembly; generate a turning input signal, the turning input signal being an electrical signal indicating the direction of turn; and direct one of the steering actuator of the trolling motor assembly or the directional actuator of the sonar assembly, via the turning input signal, to rotate the direction of one of the propulsion motor or the transducer assembly, respectively, in the direction of turn based on the turning input signal.

In some embodiments, the steering actuator of the trolling motor assembly is independently rotatable with respect to the directional actuator of the sonar assembly.

In some embodiments, the trolling motor assembly includes a shaft that extends between the steering actuator and the propulsion motor, and the directional actuator of the sonar assembly is affixed to the shaft.

In some embodiments, the user activity related to controlling the one of the direction of the propulsion motor of the trolling motor assembly or the direction of the transducer assembly of the sonar assembly comprises a same user activity.

In some embodiments, the user input assembly of the navigation control device includes a lever, and the processor is further configured to determine both the direction of turn and a rate of turn based on an angle of deflection of the lever. In some embodiments, the lever comprises a foot pedal.

In some embodiments, the user input assembly includes a pressure sensor, and the pressure sensor is configured to detect an amount of pressure applied on the pressure sensor by a user and provide a pressure value based on the detected amount of pressure. The processor is further configured to determine a rate of turn based on the pressure value.

In some embodiments, the user input assembly includes a switch, and the processor is further configured to determine a rate of turn based on a duration of time that the switch is in an active state.

In some embodiments, the processor is configured to direct the one of the steering actuator or the directional actuator to rotate the direction of the propulsion motor or the transducer assembly, respectively, via one of a wired or a wireless communication.

In some embodiments, the processor is further configured to operate in one of a first mode wherein the turning input signal is provided to the steering actuator of the trolling motor assembly, and a second mode wherein the turning input signal is provided to the directional actuator of the sonar assembly. In some embodiments, the user input assembly includes a mode switch including at least a first position for the first mode in which the turning input signal is directed to the steering actuator of the trolling motor assembly, and a second position for the second mode in which the turning input signal is directed to the directional actuator of the sonar assembly. In some embodiments, the mode switch comprises one of a button, a toggle, or a rotary knob.

In some embodiments, the trolling motor assembly includes an autopilot navigation assembly configured to operate the steering actuator of the trolling motor assembly independently of receiving the turning input signal from the processor, such that the autopilot navigation system is capable of operating the steering actuator of the trolling motor assembly simultaneously to the processor directing the directional actuator of the sonar assembly to rotate the direction of the transducer assembly.

In another example embodiment, a method for controlling operation of one of a trolling motor and a transducer array with a user input assembly is provided. The method comprises detecting user activity at the user input assembly, wherein the user activity indicates a desire of the user to control operation of either the trolling motor or the transducer array. The method further includes determining a direction of turn based on the user activity and generating, by a processor in operable communication with the user input assembly, a turning input signal, wherein the turning input signal is an electrical signal indicting the direction of turn. The method further includes transmitting the turning input signal to one of an electric steering actuator of the trolling motor and an electric directional actuator of the transducer array. The method further includes rotating one of a direction of propulsion and a direction of transmission, via one of the electric steering actuator and the electric directional actuator, based on the direction of turn indicated in the turning input signal.

In some embodiments, the method comprises detecting selection of a first mode in which the user activity controls operation of the trolling motor and detecting selection of a second mode in which the user activity controls the operation of the transducer assembly.

In another example embodiment, a user input assembly for controlling operation of one of a trolling motor assembly and a sonar assembly is provided. The user input assembly comprises a user input device configured to detect user activity related to at least one of either controlling a direction of a propulsion motor of the trolling motor or a direction of a transducer assembly of the sonar assembly. The user input assembly further includes a processor configured to: determine a direction of turn based on the user activity detected by the user input device; generate a turning input signal, the turning input signal being an electrical signal indicating the direction of turn; and direct one of a steering actuator of the trolling motor assembly or a directional actuator of the sonar assembly, via the turning input signal, to rotate the direction of one of the propulsion motor or the transducer assembly, respectively, in the direction of turn based on the turning input signal.

In some embodiments, the processor is configured to direct the one of the steering actuator or the directional actuator to rotate the direction of the propulsion motor or the transducer assembly, respectively, via one of a wired or a wireless communication.

In some embodiments, the processor is further configured to operate in one of a first mode wherein the turning input signal is provided to the steering actuator of the trolling motor assembly, and a second mode wherein the turning input signal is provided to the directional actuator of the sonar assembly. In some embodiments, the user input assembly further comprises a mode switch including at least a first position for the first mode in which the turning input signal is directed to the steering actuator of the trolling motor assembly, and a second position for the second mode in which the turning input signal is directed to the directional actuator of the sonar assembly. In some embodiments, the mode switch comprises one of a button, a toggle, or a rotary knob.

BRIEF DESCRIPTION OF THE DRAWINGS

Figure 1:
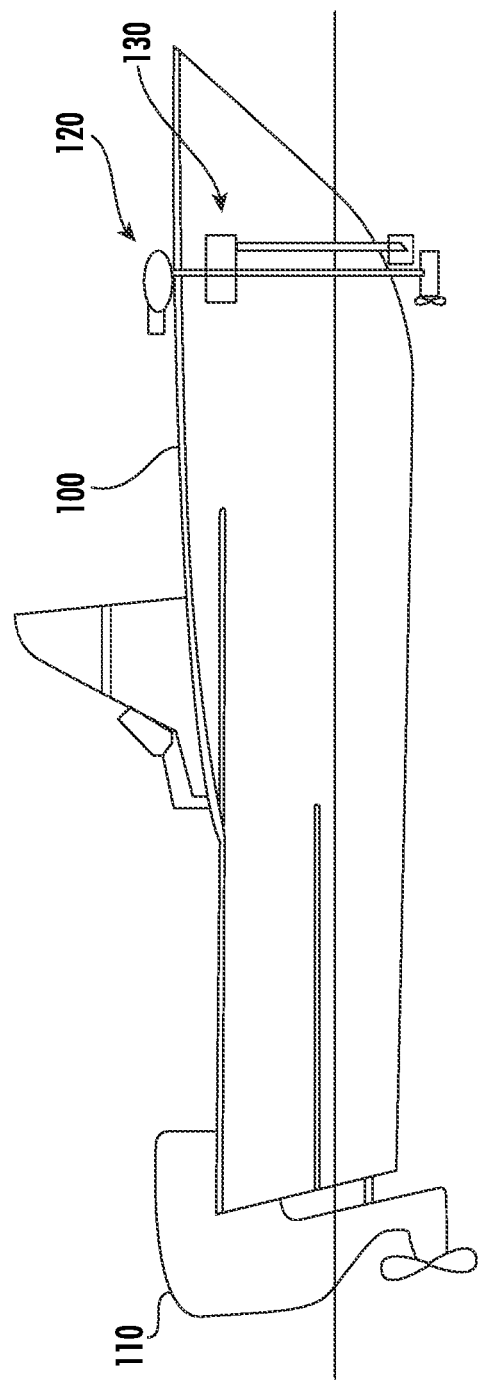
Figure 2:
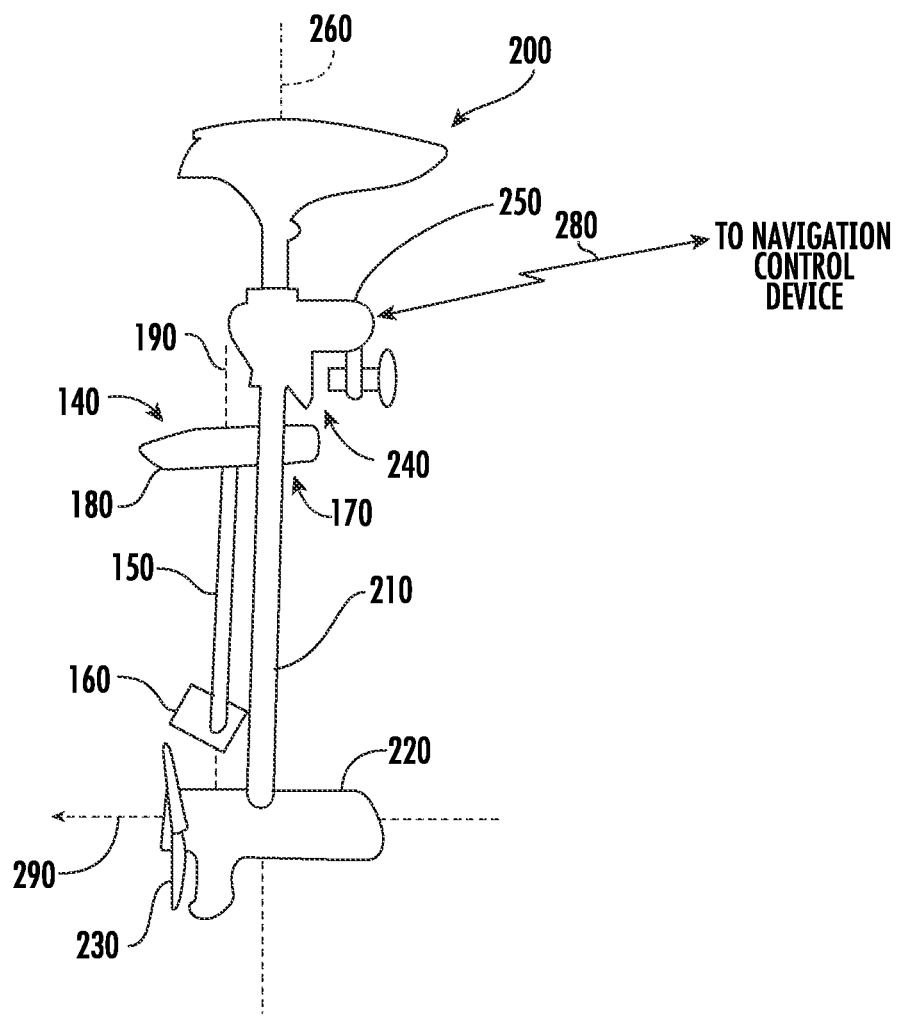
Figure 3:
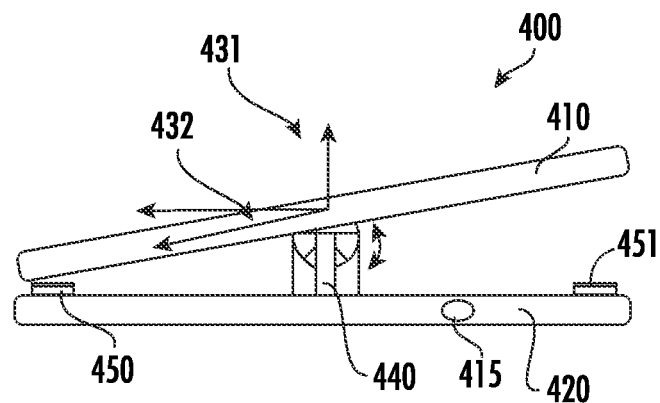
Figure 4A:
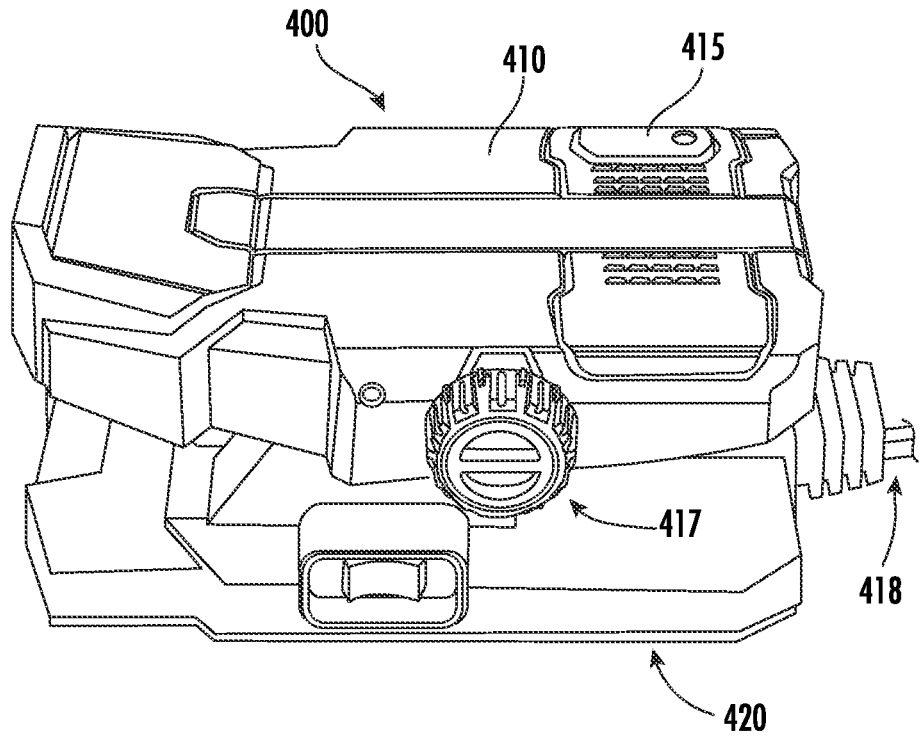
Figure 4B:
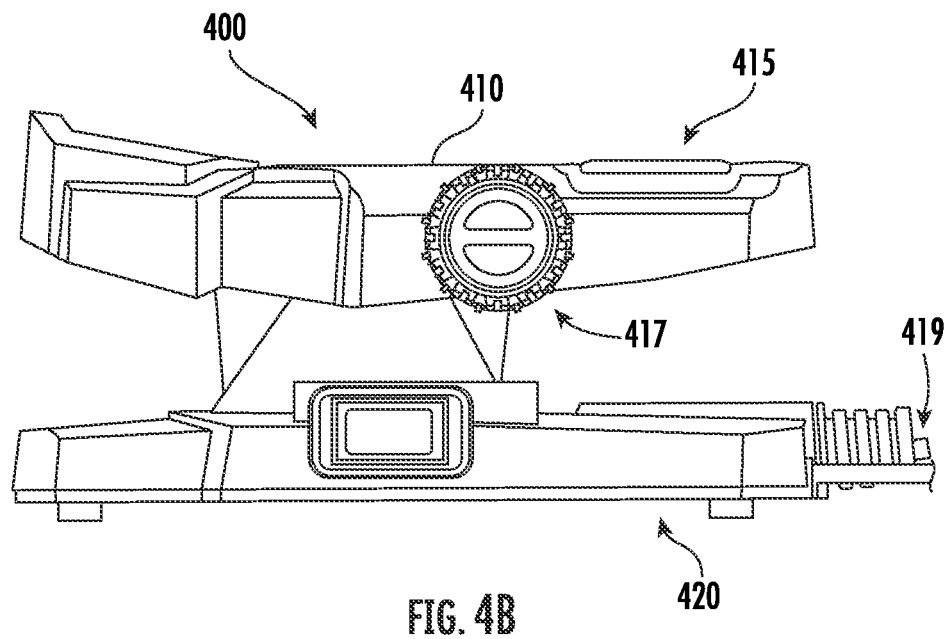
Figures 5A, 5B:
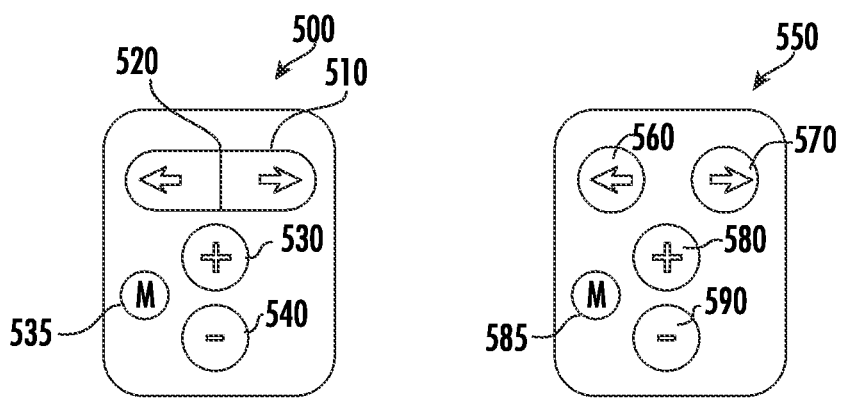
Figure 8:
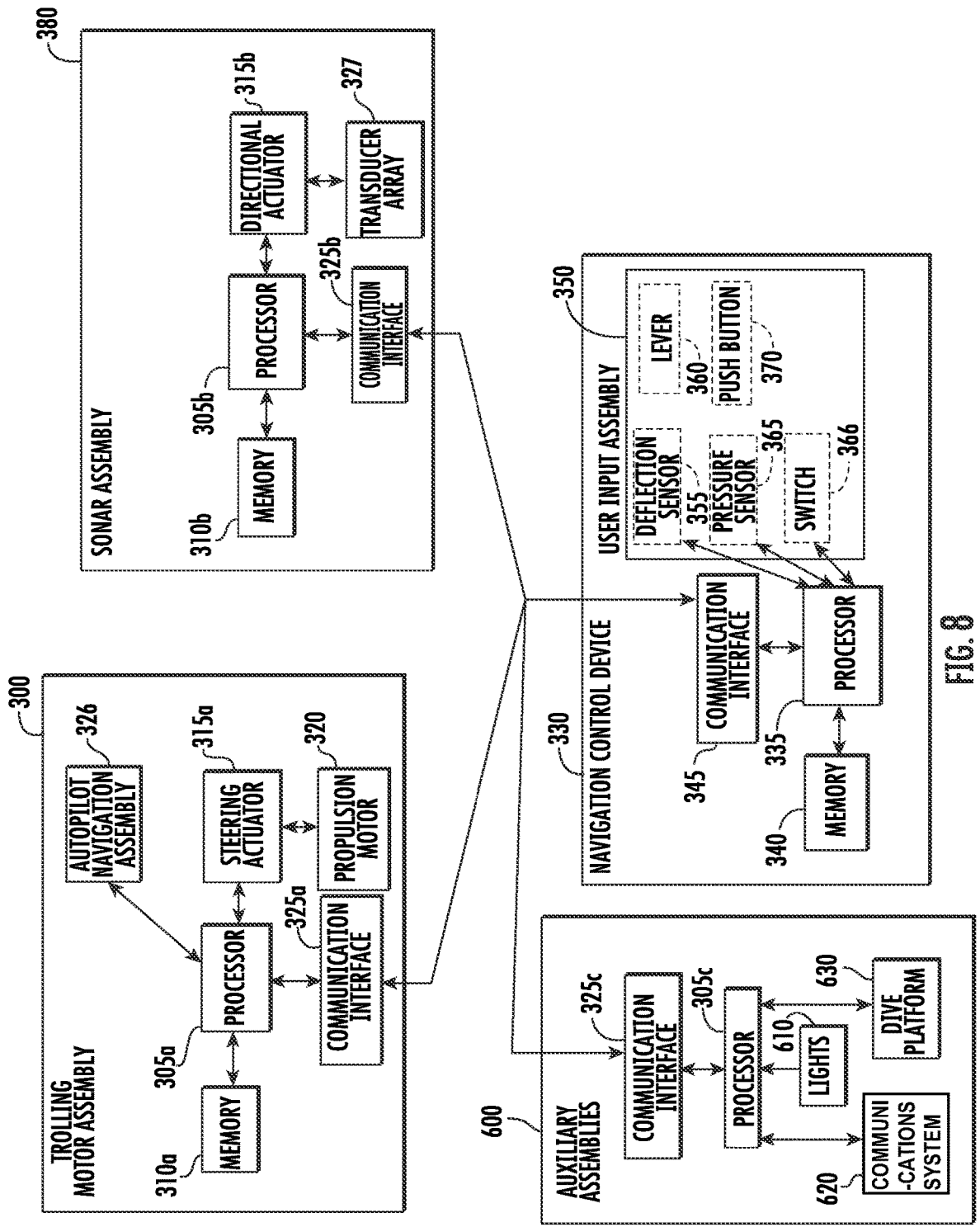
Figure 9:
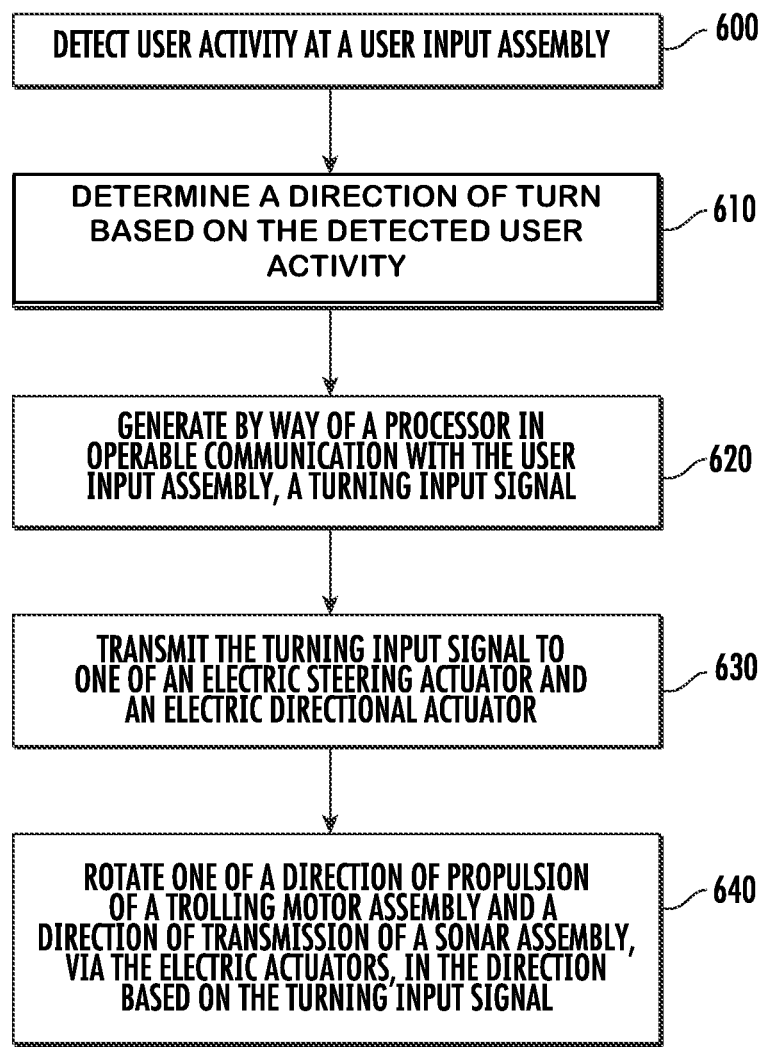

Having thus described some example embodiments in general terms, reference will now be made to the accompanying drawings, which are not necessarily drawn to scale, and wherein:

FIG. 1 shows an example watercraft with both a trolling motor assembly and a sonar assembly attached to the bow of the watercraft in accordance with some example embodiments;

FIG. 2 shows an example trolling motor assembly and sonar assembly in accordance with some example embodiments;

FIG. 3 shows an example navigation control device in the form of a foot pedal assembly in accordance with some example embodiments;

FIGS. 4A and 4B show an example navigation control device in the form of a foot pedal assembly in accordance with some example embodiments;

FIGS. 5A and 5B show example navigation control devices in the form of fobs in accordance with some example embodiments;

FIGS. 6A and 6B show an example navigation control device in the form of a foot pedal providing control signals to an example trolling motor assembly attached to the bow of a watercraft;

FIGS. 7A and 7B shown an example navigation control device in the form of a foot pedal providing control signals to an example sonar assembly attached to the bow of a watercraft;

FIG. 8 shows a block diagram of an example marine network architecture for various systems, apparatuses, and methods in accordance with some example embodiments; and FIG. 9 shows a flow chart of an example method for controlling operation of a trolling motor and a sonar transducer in accordance with some example embodiments.

DETAILED DESCRIPTION

Exemplary embodiments will be described more fully hereinafter with reference to the accompanying drawings, in which some, but not all embodiments of the invention are shown. Indeed, the embodiments take many different forms and should not be construed as being limiting. Rather, these example embodiments are provided so that this disclosure will satisfy applicable legal requirements. Like reference numerals refer to like elements throughout.

FIG. 1 illustrates an example watercraft 100 on a body of water. The watercraft 100 includes a main engine 110, a trolling motor system 120, and a sonar system 130. According to some example embodiments, the trolling motor system 120 may be comprised of a trolling motor assembly including a propulsion motor and a propeller, and a navigation control device used to control the speed and the course or direction of propulsion. The trolling motor assembly may be attached to the bow of the watercraft 100 and the motor and propeller may be submerged in the body of water. However, positioning of trolling motor system 120 need not be limited to the bow, and may be placed elsewhere on a watercraft. The trolling motor system 120 can be used to propel the watercraft 100 under certain circumstances, such as, when fishing and/or when wanting to remain in a particular location despite the effects of wind and currents on the watercraft 100. Depending on the design, the propeller of a trolling motor assembly may be driven by a gas-powered engine or an electric motor. Moreover, steering the trolling motor system 120 may be accomplished manually via hand control, via foot control, or even through use of a remote-control fob. Additionally, in some cases, an autopilot may operate the trolling motor autonomously, such as when anchor mode is selected.

According to some sample embodiments, the sonar system 130 may be comprised of a sonar assembly including a directional actuator, a transducer assembly, and the navigational control device that may be used to control the trolling motor system 120. The sonar system 130 may be attached to the trolling motor system 120 such that the transducer assembly is submerged in the body of water when the propeller is submerged. However, positioning of the sonar system 130 need not be limited to the trolling motor system 120, and may be placed elsewhere on the watercraft, such as directly to the bow, stern, or side, as shown in FIGS. 6A and 6B. The sonar system 130 can be used to detect waterborne or underwater objects. For example, the sonar system 130 may be used to determine depth and bottom topography, detect fish, etc.

FIG. 2 illustrates an example trolling motor assembly 200, as well as an example sonar assembly 140, according to some example embodiments. The trolling motor assembly 200 may include a shaft 210, a motor 220, a propeller 230, and an attachment device 240. The trolling motor assembly 200 may be affixed to a side of a watercraft via attachment device 240, which may be, for example, an adjustable clamp. According to some example embodiments, the trolling motor assembly 200 may also include other components such as, for example, lights, temperature sensors, etc.

Further, the trolling motor assembly may include a steering actuator 250 that is configured to actuate to cause rotation of the shaft 210, and accordingly rotation of the propeller 230, about axis 260 to change the facing direction (e.g., the direction of propulsion). To cause rotation and control of the direction of propulsion (or the direction the trolling motor is oriented, which may correspond to the direction of propulsion when the motor of the trolling motor is operating), the steering actuator 250 may directly rotate the shaft 210 or a series of cam shafts or gears may be employed to cause the rotation. The steering actuator 250 may be controlled via signals transmitted to the steering actuator from a navigation control device via a wireless connection 280. In other example embodiments, a wired connection 419 (FIG. 4A) may be utilized to convey signals to the steering actuator 250.

Still referring to FIG. 2, the sonar assembly 140 may include a shaft 150, a transducer array 160, and an attachment device 170. The sonar assembly 140 may be affixed to either the shaft 210 of the trolling motor assembly 200 or directly to a side, bow, or stern of a watercraft via an attachment device 170, which may be, for example, an adjustable clamp. Further, the sonar assembly 140 may include a directional actuator 180 that is configured to actuate to cause rotation of the shaft 150, and accordingly rotation of the transducer array 160, about axis 290 to change the direction in which the transducer array 160 is directed with respect to the watercraft. To cause rotation and control of the orientation of the transducer array 160, the directional actuator 180 may directly rotate the shaft 160 on a series of cam shafts or gears may be employed to cause the rotation. The directional actuator 180 may be controlled via signals transmitted to the directional actuator 180 from a navigation control device, the same navigation control device that may be used to send signals to the steering actuator of the trolling motor assembly, such as via a wireless connection 280. In other example embodiments, a wired connection 419 (FIG. 4A) may be utilized to convey signals to the directional actuator 180.

FIG. 3 shows an example implementation of a user input assembly of a navigation control device according to various example embodiments in the form of a foot pedal assembly 400. The foot pedal assembly 400 may be one example of a user input assembly that includes a deflection sensor and a lever. The foot pedal assembly 400 may be in operable communication with one of the trolling motor assembly 200 and the sonar assembly 140, via, for example, the processor as described with respect to FIG. 8. Foot pedal assembly 400 includes a lever 410 in the form of a foot pedal 431 that can pivot about an axis (as indicated by the arrows) in response to movement of, for example, a user's foot. The foot pedal assembly 400 further includes a support base 480 and a deflection sensor 440. The deflection sensor 440 may measure the deflection of the foot pedal 410 and provide an indication of the deflection to, for example, processor. A corresponding steering/directional input signal having an indication of a direction of turn (and, in some embodiments, a rate of turn) may be ultimately provided to an actuator (e.g., steering actuator 315a or directional actuator 315b of FIG. 8) via a wireless connection.

Additionally, the foot pedal assembly 400 preferably includes a control, such as a button 415, related to switching the foot pedal assembly 400 between at least a first mode in which the foot pedal assembly 400 provides control signals to the trolling motor assembly 200 and a second mode in which control signals are provided to the sonar assembly 140. As such, a user may switch between control of either the trolling motor assembly 200 or the sonar assembly 140 with the foot pedal assembly 400 by simply depressing the button 415. According to some sample embodiments, additional modes of operation for the foot pedal assembly 400 may be selected in which the foot pedal assembly 400 is used to provide control signals to auxiliary assemblies 600 (FIG. 8) of the corresponding watercraft such as, but not limited to, accent lighting 610, entertainment systems 620, dive platforms 630, etc. For example, such control signals may be used to dim/brighten accent lighting, raise/lower the volume of radios and televisions, extend/retract a dive platform, etc. In some embodiments, rather than the button 415, an alternate user input that could be toggled, moved, rotated, etc., could be used to select the mode of operation of the foot pedal assembly 400.

According to some example embodiments, the measured deflection of the foot pedal 410 may be an indication of the desired direction (and, in some embodiments, a desired rate of turn) for either the propulsion direction of the trolling motor assembly 200 or the transmission direction of the sonar assembly 140, depending upon the mode in which the user has placed the foot pedal assembly 400 of the navigation control device. In this regard, a user may cause the foot pedal 410 to rotate or deflect by an angle (according to example coordinate system 432) and the angle may be measured (e.g., in degrees) by the deflection sensor 440. According to some example embodiments, when the above mentioned first mode is selected for the foot pedal assembly 400, rotation of the foot pedal 410 in the counterclockwise direction (such that the left side of the foot pedal 410 is tilted down), as shown in FIG. 6A, may cause the propulsion direction to turn to the left and, in some embodiments, at a desired rate of turn, while rotation of the foot pedal 410 in the clockwise direction (such that the right side of the foot pedal is tilted down), as shown in FIG. 6B, may cause the propulsion direction to turn to the right and, in some embodiments, at the desired rate of turn. According to some example embodiments, when the above mentioned second mode is selected for the foot pedal assembly 400, rotation of the foot pedal 410 in the counterclockwise direction (such that the left side of the foot pedal is tilted down), as shown in FIG. 7A, may cause the orientation of the transducer array 160 of the sensor assembly 140, to turn to the left and, in some embodiments, at a desired rate of turn, while rotation of the foot pedal 410 in the clockwise direction (such that the right side of the foot pedal is tilted down), as shown in FIG. 7B, may cause the orientation of the transducer array 160, to turn to the right and, in some embodiments, at the desired rate of turn. In some embodiments, the rate of turn may be a function of the magnitude of the angle measured by the deflection sensor 440. In this regard, for example, with each increase of an angle of deflection, the rate of turn may also increase proportionally based on a linear or exponential function. For example, if the foot pedal 410 is deflected by 5 degrees from a given origin, then the rate of turn may be 1 degree of rotation per second for the propulsion direction change. However, if the deflection angle is 10 degrees, the rate of turn may be 5 degrees of rotation per second for the propulsion direction change.

While the foot pedal assembly 400 is shown as including the foot pedal 410 to control the direction of rotation of the propulsion direction and the sonar assembly orientation, the foot pedal assembly 400 may also include other controls, such as related to determining the rate of turn for the trolling motor assembly 200 and the sonar assembly 140. For example, as shown in FIGS. 4A and 4B, propulsion speed controls, such as a speed wheel 417, may also be included on the foot pedal assembly 400. In such example embodiments, the speed wheel 417 may be utilized by a user to select a rate of turn rather than a rate of deflection or amount of deflection of the foot pedal, as previously discussed above. As shown, in some example embodiments, mode selector button 415 may be positioned on an upper surface of the foot pedal 410 to allow a user to switch modes of operation of the foot pedal assembly 400 with their foot.

FIG. 5A provides another example user input assembly that includes a deflection sensor and a lever. A fob 500 may be an embodiment of a user input assembly that includes, for example, the processor 335 described with respect to FIG. 8. The fob may include rocker button 510 that pivots about axis. The rocker button 510 may form the lever of some example embodiments and a deflection of the rocker button 510 may be measured by a deflection sensor (not shown). With respect to operation, a user may depress one side of the rocker button 510 to cause the rocker button 510 to deflect from its origin position. The angle of deflection may be measured by the deflection sensor and communicated to the processor as a direction and rate of turn. As described above, increases in the angle of deflection can result in increased rates of turn.

The fob 500 also includes a mode select button 535 that, similarly to the above described button 415 of the foot pedal assembly 400, is used to control whether fob 500 provides control signals to either the trolling motor assembly 200 or the sonar assembly 140. Fob 500 may also include other controls, such as, a propulsion increase button 530 and propulsion decrease button 540. Propulsion increase button 530 and propulsion decrease button 540 may be operated to control the propulsion speed of a propulsion motor when providing control signals to the trolling motor assembly 200. Alternately, when providing control signals to the sonar assembly 140, increase button 530 and decrease button 540 may be used, for example, to adjust the angle of the transducer array 160 within a vertical plane.

According to some example embodiments, a change with respect to time in the angle of deflection may alternatively be used to indicate a desired rate of turn. In this regard, if a lever rapidly moves from, for example, an origin position to a given angle of deflection, then the rate of turn would be higher. For example, with respect to the foot pedal assembly 400, if a user was to stomp on the foot pedal 410 to generate a rapid change in the angle of deflection as measured by the deflection sensor 440 with respect to time, then a high rate of turn may be determined by the processor 335. Likewise, if a user slowly changes the angle of deflection, then the processor 335 may determine a lower rate of turn. In a similar fashion, the rate of change of the angle of the deflection of the rocker button 510 may be monitored to determine a rate of turn for provision to a steering actuator. As such, the processor 335 may be configured to determine a rate of turn based on the rate at which and angle of deflection changes with respect to time.

Referring again to FIG. 3, in some embodiments, the foot pedal 410 may include pressure sensors 450 and 451 (e.g., in combination with or as an alternative to deflection sensor 440). Accordingly, as a user depresses the foot pedal 410 onto one of the pressure sensors, a pressure (or force) may be applied to the sensor and the sensor may measure the pressure. If pressure is applied to sensor 450, then a rate of turn in a first direction may be determined, and if pressure is applied to sensor 451, then a rate of turn in the opposite direction may be determined.

In a similar manner, rather than utilizing a rocker button 510, as shown in FIG. 5A, pressure sensors may be used in conjunction with a fob 550 to measure pressure in order to determine a rate of turn. Along these lines, the fob 550 shown in FIG. 5B may use pressure sensors to determine a direction and a rate of turn. In this regard, fob 550 may be similar to fob 500, with the exception that rather than a rocker button, two separate push buttons 560 and 570 may be included. One or more pressure sensors may be operably coupled to push buttons 560 and 570 to detect an amount of pressure being applied to the buttons. Again, a pressure value may be measured and used to determine both a direction and a rate of turn by the processor 335 (FIG. 8). Similar to fob 500, fob 550 may also include a mode select button 585, a propulsion/tilt increase button 580, and propulsion/tilt decrease button 590 to control the propulsion speed of the trolling motor assembly 200 or angle of transmission of the sonar assembly 140.

Referring again to FIG. 3, in some embodiments, instead of pressure sensors, sensors 450 and 451 may be switches. In such an example embodiment, as a user depresses the foot pedal 410 onto the switch, the switch may transition to an active state. Further, a user may hold the foot pedal 410 in that position for a duration of time. The duration of time may be measured and as it increases, the rate of turn may increase. In other words, holding the foot pedal 410 down longer can cause the rate of turn to increase. In a similar manner, switches may be used in conjunction with the fob 500 and a duration of time in an active state may be measured on either end of the rocker switch 510 to determine a rate of turn. Switches may also be used with fob 550, such as through buttons 560 and 570 in a similar manner.

While the above example embodiments utilize sensors that measure angle of deflection, pressure, and duration of time of pressing, some embodiments of the present invention contemplate other types of sensors for correlating to a desired rate of turn (e.g., capacitive, among others). Further, while the above example embodiments utilize a foot pedal or fob, some embodiments of the present invention contemplate use with other systems/structures, such as a touch screen, a user input assembly on the trolling motor or a remote marine electronics device.

FIG. 8 shows a block diagram of a trolling motor assembly 300 (similar to the trolling motor assembly 200), a sonar assembly 380 (similar to the sensor assembly 140) in communication with a navigation control device 330, and an auxiliary assembly 600. As described herein, it is contemplated that while certain components and functionalities of components may be shown and described as being part of the trolling motor assembly 300, the sonar assembly 380, or the navigation control device 330, according to some example embodiments, some components (e.g., the autopilot navigation assembly, functionalities of the processors 305a, 305b, and 335, or the like) may be included in the others of the trolling motor assembly 300, the sonar assembly 380, or the navigation control device 330.

As depicted in FIG. 8, the trolling motor assembly 300 may include a processor 305a, a memory 310a, a steering actuator 315a, a propulsion motor 320, and a communication interface 325a. According to some example embodiments, the trolling motor assembly 300 may also preferably include an autopilot navigation assembly 326. Also as depicted in FIG. 8, the sonar assembly 380 may include a processor 305b, a memory 310b, a directional actuator 315b, a communications interference 325b, and a transducer array 327. As well, the auxiliary assembly 600 may include a processor 305c, communications interference 325c, lighting 610, a communications system 620, a dive platform 630, etc.

The processors 305a, 305b, and 350c may be any means configured to execute various programmed operations or instructions stored in a memory device such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processors 305a, 305b, and 305c as described herein. In this regard, the processor 305a may be configured to analyze electrical signals communicated thereto, for example in the form of a steering input signal received via the corresponding communication interface 325a, and instruct the steering actuator 315a to rotate the propulsion motor 320 in accordance with a received direction and rate of turn. Alternatively, the processor 305b may be configured to analyze electrical signals communicated thereto in the form of a directional input signal, and instruct the directional actuator 315b to rotate the transducer array 327 in accordance with a received rotational signal. Processor 305c may be configured to analyze electrical signals communicated thereto in the form of control signals for the various associated systems, i.e., lights 610, entertainment system 620, etc., and operate the associated systems in accordance with the received control signals.

The memories 310a and 310b may be configured to store instructions, computer program code, trolling motor steering codes and instructions, marine data, such as sonar data, chart data, location/position data, and other data in a non-transitory computer readable medium for use, such as by the processors 305a and 305b.

The communication interfaces 325a and 325b may be configured to enable connection to external systems (e.g., trolling motor assembly 300 and sonar assembly 380). In this manner, the processors 305a and 305b may retrieve stored data from remote, external servers via their communication interfaces 325a and 325b in addition to or as an alternative to their memories 310a and 310b, respectively.

The processor 305a of trolling motor assembly 300 may be in communication with and control the steering actuator 315a. Steering actuator 315a may be an electronically controlled mechanical actuator (i.e., an electro-mechanical actuator) configured to actuate at various rates (or speeds) in response to respective signals or instructions. As described above with respect to steering actuator 250 (FIG. 2), steering actuator 315a may be configured to rotate the propulsion motor 320, a rudder, or a direction of propulsion, regardless of the means for doing so, in response to electrical signals. To do so, steering actuator 315a may employ a solenoid, a motor, or the like configured to convert an electrical signal into a mechanical movement. The range of motion to turn the propulsion motor 320 may be 360 degrees, 180 degrees, 90 degrees, 37 degrees, or the like. Further, with respect to being variable speed, the steering actuator 315a may be configured to receive a signal that indicates a rate of turn for the propulsion motor 320 (e.g., 10 degrees/second, 5 degrees/second, or the like) and actuate at a respective rate to support the desired rate of turn for the propulsion direction.

The propulsion motor 320 may be any type of propulsion device configured to urge a watercraft through the water. The propulsion motor 320 may be variable speed to enable the propulsion motor 320 to move the watercraft at different speeds or with different power or thrust.

Similarly, the processor 305b of the sonar assembly 380 may be in communication with and control the directional actuator 315b. Directional actuator 315b may be an electronically controlled mechanical actuator (i.e., an electro-mechanical actuator) configured to actuate at various rates (or speeds) in response to respective signals or instructions. As described above with respect to directional actuator 180 (FIG. 2), directional actuator 315b may be configured to rotate the shaft and, therefore, transducer array 327, regardless of the means for doing so, in response to electrical signals. To do so, directional actuator 315b may employ a solenoid, a motor, or the like configured to convert an electrical signal into a mechanical movement. The range of motion to turn the transducer array 327 may be 360 degrees, 180 degrees, 90 degrees, 37 degrees, or the like. Further, with respect to being variable speed, the directional actuator 315b may be configured to receive a signal that indicates a rate of turn for the transducer assembly 327 (e.g., 10 degrees/second, 5 degrees/second, or the like) and actuate at a respective rate to support the desired rate of turn for the transmission direction.

The sonar assembly 380 may include a sonar transducer array 327 that may be affixed to a component of the trolling motor assembly 300, such as the shaft 210 (FIG. 2), such that is disposed underwater when the trolling motor assembly 300 is operating. In this regard, the transducer array 327 may be in a housing and configured to gather sonar data from the underwater environment surrounding the watercraft. Accordingly, the processor 305b (such as through execution of computer program code) may be configured to receive sonar data from the transducer array 327, and process the sonar data to generate an image based on the gathered sonar data. In some example embodiments, the sonar assembly 380 may be used to determine depth and bottom topography, detect fish, locate wreckage, etc. Sonar beams, from the sonar transducer 327, can be transmitted into the underwater environment and echoes can be detected to obtain information about the environment. In this regard, the sonar signals can reflect off objects in the underwater environment (e.g., fish, structures, sea floor bottom, etc.) and return to the transducer, which converts the sonar returns into sonar data that can be used to produce an image of the underwater environment. According to some example embodiments, the sonar assembly 380 may include or be in communication with a display to render the image for display to a user.

According to some example embodiments, the autopilot navigation assembly 326 may be configured to determine a destination (e.g., via input by a user) and route for a watercraft and control the steering actuator 315*a*, via the processor 305*a*, to steer the propulsion motor 320 in accordance with the route and destination independent of any input from a user by way of the navigation control device 330. In this regard, the processor 305*a* and memory 310*a* may be considered components of the autopilot navigation assembly 326 to perform its functionality, but the autopilot navigation assembly 326 may also include position sensors. The memory 310*a* may store digitized charts and maps to assist with autopilot navigation. To determine a destination and route for a watercraft, the autopilot navigation assembly 326 may employ a position sensor, such as, for example, a global positioning system (GPS) sensor. Based on the route, the autopilot navigation assembly 326 may determine that different rates of turn for propulsion may be needed to efficiently move along the route to the destination. As such, the autopilot navigation assembly 326 may instruct the steering actuator 315*a*, via the processor 305*a*, to turn in accordance with different rates of turn as defined in a planned route. According to some example embodiments, a rate of turn during a route may be a function of, for example, the prevailing winds, ocean currents, weather considerations, or the like at the location of the turn. As well, the autopilot navigation assembly 326 may be configured to maintain a watercraft in a desired location (e.g., when a user selects an "anchor mode") by controlling the steering actuator 315*a*, via the processor 305*a*, to steer the propulsion motor 320 based on inputs from the aforementioned GPS sensor. Utilization of the autopilot navigation assembly 326 to autonomously steer the propulsion motor 320 of the watercraft allows a user to provide control signals to an alternate system, such as the sonar assembly 380, by selecting the corresponding mode of operation of the navigation control device 330.

As mentioned above, the trolling motor assembly 300 and sonar assembly 380 may be in communication with a navigation control device 330 that is configured to selectively control the operation of both the trolling motor assembly 300 and sonar assembly 380. In this regard, the navigation control device 330 may include a processor 335, a memory 340, a communication interface 345, and a user input assembly 350.

The processor 335 may be any means configured to execute various programmed operations or instructions stored in a memory device, such as a device or circuitry operating in accordance with software or otherwise embodied in hardware, or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 335 as described herein. In this regard, the processor 335 may be configured to analyze signals from the user input assembly 350 and convey the signals or variants of the signals, via the communication interface 345 to either the trolling motor assembly 300 or the sonar assembly 380.

The memory 340 may be configured to store instructions, computer program code, trolling motor steering codes and instructions, marine data, such as sonar data, chart data, location/position data, and other data in a non-transitory computer readable medium for use, such as by the processor 335.

The communication interface 345 may be configured to enable connection to external systems (e.g., communication interfaces 325*a* and 325*b*). In this manner, the processor 335 may retrieve stored data from a remote, external server via the communication interface 345 in addition to, or as an alternative to, the memory 340.

Communication interfaces 325*a*, 325*b*, and 345 may be configured to communicate via a number of different communication protocols and layers. For example, the link between the communication interfaces 325*a* and 325*b*, and communication interface 345 may be any type of wireless communication link. For example, communications between the interfaces may be conducted via Bluetooth, Ethernet, the NMEA 2000 framework, cellular, WiFi, or other suitable networks.

According to various example embodiments, the processor 335 may operate on behalf of the trolling motor assembly 300, the sonar assembly 380, and the navigation control device 330. In this regard, the processor 335 may be configured to perform some or all of the functions described with respect to processors 305*a* and 305*b*, and processor 335 may communicate directly to the autopilot navigation assembly 326, the steering actuator 315*a*, or the directional actuator 315*b* directly via a wireless communication.

The processor 335 may also interface with the user input assembly 350 to obtain information including a direction and/or a rate of turn for either the trolling motor assembly 300 or the sonar assembly 380 based on user activity that are one or more inputs to the user input assembly 350. In this regard, the processor 335 may be configured to determine the direction and rate of turn based on user activity detected by the user input assembly 350, and generate a steering/directional input signal. The steering/directional input signal may be an electrical signal indicating the direction of turn. Further, the processor 335 may be configured to direct the steering/directional actuator 315*a*/315*b*, directly or indirectly, to rotate the propulsion motor 320/transducer assembly 327, respectively, at a desired rate of turn based on the rate of turn indicated in the input signal. According to some example embodiments, the processor 335 may be further configured to modify the rate of turn indicated in the steering/directional input signal to different values based on variations in the user activity detected by the user input assembly 350.

Various example embodiments of a user input assembly 350 may be utilized to detect the user activity and facilitate generation of a steering input signal indicating a rate of turn. To do so, various sensors including feedback sensors, and mechanical devices that interface with the sensors, may be utilized. For example, a deflection sensor 355, a pressure sensor 365, or a switch 366 may be utilized as sensors to detect user activity with respect to a rate of turn or mode of operation (e.g., whether control signals are to be received by the trolling motor assembly 300 or the sonar assembly 380). Further, lever 360 and push button 370 may be mechanical devices that are operably coupled to a sensor and may interface directly with a user to facilitate inputting either a rate of turn or a mode selection by the user via the user input assembly 350. For example, a user may manipulate one of lever 360 and push button 370 to determine whether navigation control device provides control signals to either trolling motor assembly 300 or sonar assembly 380.

According to some example embodiments, a deflection sensor 355 and a lever 360 may be utilized as the user input assembly 350. The deflection sensor 355 may be any type of sensor that can measure an angle of deflection of an object, for example, a lever 360 from a center or zero position. In this regard, the processor 335 may be configured to determine a desired rate of turn of the propulsion/transmission direction based on an angle of deflection (e.g., from a set point or origin) of the lever 360 measured by the deflection sensor 355. For example, as a user increases the angle of deflection, for example, from an origin, a rate of turn for the direction of propulsion/transmission may also increase thereby implementing a variable rate of turn for the propulsion/transmission direction. In other words, for example, as the angle of deflection increases, rotation of the propulsion/transmission direction will accelerate.

According to some embodiments, rather than using techniques that measure an angle of deflection, a pressure sensor 365 may be used in conjunction with, for example, either the lever 360 or a push button 370 to determine a rate of turn. In this regard, the pressure sensor 365 may be configured to detect an amount of pressure applied on the pressure sensor by a user and provide a pressure value to the processor 335 based on the detected amount of pressure. In turn, the processor 335 may be configured to determine a rate of turn based on the pressure value. According to some example embodiments, higher detected amounts of pressure may indicate a higher rate of turn. The rate of turn may have a linear or exponential relationship to the pressure value.

According to some example embodiments, a rate of turn may be determined based on a duration of time that a switch, such as switch 366, is in an active position. In this regard, switch 366 may have two states an active state (e.g., "on") and an inactive state (e.g., "off"). According to some example embodiments, switch 366 may normally be in the inactive state and user activity, such as actuation of the lever 360 or the push button 370, may be required to place the switch 366 in the active state. When in the active state, a duration of time in the active state may be detected and the rate of turn may be a function of the duration of time that the switch 366 is in the active state.

Example embodiments also include methods of controlling operation of a trolling motor assembly and/or sonar assembly as shown in FIG. 9 and in the associated description. In this regard, FIG. 9 illustrates a flowchart of various operations that may, for example, be performed by, with the assistance of, or under the control of one or more of the processors 305a and 305b, and 335, or with other associated components described with respect to FIG. 8 or otherwise herein, and these components may therefore constitute means for performing the respective operations.

In this regard, the example method may include detecting user activity at a user input assembly at 600. According to some example embodiments, detecting user activity may include detecting a mode of operation of the user input assembly for controlling either a trolling motor assembly or a sonar assembly, detecting an angle of deflection of a lever (e.g., a foot pedal or a rocker button), detecting a rate at which an angle of deflection of a lever changes with respect to time, detecting a switch being in an active state, detecting an amount of pressure on a pressure sensor, or the like. At 610, the example method may include determining a direction of turn based on the user activity. In this regard, determining the direction of turn may include determining the direction of turn based on an angle of deflection of a lever, a duration of time that a switch is in an active state, an amount of pressure on a pressure sensor, or the like. Further, at 620, the example method may include generating, by a processor in operable communication with the user input assembly, a turning input signal. In this regard, the turning input signal may be an electrical signal indicating the direction of turn. The example method may include, at 630, transmitting the turning input signal to one of an electric steering actuator and an electric directional actuator and, at 640, rotating one of a direction of propulsion and a direction of transmission, via the electric actuators, in the desired direction based on the turning input signal.

FIG. 9 and the associated description illustrates a collection of operations of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 310a, 310b, or 340 and executed by, for example, the processor 305a, 305b, or 335. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device to cause a series of operations to be performed on the computer or other programmable apparatus to produce a computer-implemented process such that the instructions which execute on the computer or other programmable apparatus implement the functions specified in the flowchart block(s).

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

The invention claimed is:

1. A system comprising:
a trolling motor assembly comprising a propulsion motor and a steering actuator, wherein the steering actuator is configured to rotate a direction of the propulsion motor in response to an electrical signal;
a sonar assembly comprising a transducer assembly and a directional actuator, wherein the directional actuator is configured to rotate a direction of the transducer assembly in response to an electric signal;
a user input assembly, wherein the user input assembly is configured to detect user activity related to at least one of either controlling the direction of the propulsion motor of the trolling motor assembly or the direction of the transducer assembly of the sonar assembly, wherein the user activity related to controlling the one of the direction of the propulsion motor of the trolling motor assembly or the direction of the transducer assembly of the sonar assembly comprises a same user activity; and
a processor, the processor configured to:
    determine a direction of turn based on the user activity detected by the user input assembly;
    generate a turning input signal, the turning input signal being an electrical signal indicating the direction of turn; and
    direct one of the steering actuator of the trolling motor assembly or the directional actuator of the sonar assembly, via the turning input signal, to rotate the direction of one of the propulsion motor or the transducer assembly, respectively, in the direction of turn based on the turning input signal.

2. The system of claim 1, wherein the steering actuator of the trolling motor assembly is independently rotatable with respect to the directional actuator of the sonar assembly.

3. The system of claim 1, wherein the trolling motor assembly includes a shaft that extends between the steering actuator and the propulsion motor, and the directional actuator of the sonar assembly is affixed to the shaft.

4. The system of claim 1, wherein the user input assembly of the navigation control device includes a lever; and
wherein the processor is further configured to determine both the direction of turn and a rate of turn based on an angle of deflection of the lever.

5. The system of claim 4, wherein the lever comprises a foot pedal.

6. The system of claim 1, wherein the user input assembly includes a pressure sensor, wherein the pressure sensor is configured to detect an amount of pressure applied on the pressure sensor by a user and provide a pressure value based on the detected amount of pressure; and
wherein the processor is further configured to determine a rate of turn based on the pressure value.

7. The system of claim 1, wherein the user input assembly includes a switch; and
wherein the processor is further configured to determine a rate of turn based on a duration of time that the switch is in an active state.

8. The system of claim 1, wherein the processor is configured to direct the one of the steering actuator or the directional actuator to rotate the direction of the propulsion motor or the transducer assembly, respectively, via one of a wired or a wireless communication.

9. The system of claim 1, wherein the processor is further configured to operate in one of a first mode wherein the turning input signal is provided to the steering actuator of the trolling motor assembly, and a second mode wherein the turning input signal is provided to the directional actuator of the sonar assembly.

10. The system of claim 9, wherein the user input assembly includes a mode switch including at least a first position for the first mode in which the turning input signal is directed to the steering actuator of the trolling motor assembly, and a second position for the second mode in which the turning input signal is directed to the directional actuator of the sonar assembly.

11. The system of claim 10, wherein the mode switch comprises one of a button, a toggle, or a rotary knob.

12. The system of claim 1, wherein the trolling motor assembly includes an autopilot navigation assembly configured to operate the steering actuator of the trolling motor assembly independently of receiving the turning input signal from the processor, such that the autopilot navigation system is capable of operating the steering actuator of the trolling motor assembly simultaneously to the processor directing the directional actuator of the sonar assembly to rotate the direction of the transducer assembly.

13. A method for controlling operation of one of a trolling motor and a transducer array with a user input assembly, the method comprising:
detecting user activity at the user input assembly, wherein the user activity indicates a desire of the user to control operation of either the trolling motor or the transducer array;
determining a direction of turn based on the user activity;
detecting selection of a first mode in which the user activity controls operation of the trolling motor or detecting selection of a second mode in which the user activity controls the operation of the transducer assembly;
generating, by a processor in operable communication with the user input assembly, a turning input signal, wherein the turning input signal is an electrical signal indicting the direction of turn;
transmitting the turning input signal to one of an electric steering actuator of the trolling motor and an electric directional actuator of the transducer array; and
rotating one of a direction of propulsion and a direction of transmission, via one of the electric steering actuator and the electric directional actuator, based on the direction of turn indicated in the turning input signal.

14. A user input assembly for controlling operation of one of a trolling motor assembly and a sonar assembly, the user input assembly comprising:
a user input device configured to detect user activity related to at least one of either controlling a direction of a propulsion motor of the trolling motor or a direction of a transducer assembly of the sonar assembly; and
a processor configured to:
    determine a direction of turn based on the user activity detected by the user input device;
    generate a turning input signal, the turning input signal being an electrical signal indicating the direction of turn; and
    direct one of a steering actuator of the trolling motor assembly or a directional actuator of the sonar assembly, via the turning input signal, to rotate the direction of one of the propulsion motor or the transducer assembly, respectively, in the direction of turn based on the turning input signal, wherein the processor is further configured to operate in one of a first mode wherein the turning input signal is provided to the steering actuator of the trolling motor assembly and a second mode wherein the turning input signal is provided to the directional actuator of the sonar assembly.

15. The user input assembly of claim 14, wherein the processor is configured to direct the one of the steering actuator or the directional actuator to rotate the direction of the propulsion motor or the transducer assembly, respectively, via one of a wired or a wireless communication.

16. The user input assembly of claim 14 further comprising a mode switch including at least a first position for the first mode in which the turning input signal is directed to the steering actuator of the trolling motor assembly, and a second position for the second mode in which the turning input signal is directed to the directional actuator of the sonar assembly.

17. The user input assembly of claim 16, wherein the mode switch comprises one of a button, a toggle, or a rotary knob.

18. A system comprising:
a trolling motor assembly comprising a propulsion motor and a steering actuator, wherein the steering actuator is configured to rotate a direction of the propulsion motor in response to an electrical signal;
a sonar assembly comprising a transducer assembly and a directional actuator, wherein the directional actuator is configured to rotate a direction of the transducer assembly in response to an electric signal;
a user input assembly, wherein the user input assembly is configured to detect user activity related to at least one of either controlling the direction of the propulsion motor of the trolling motor assembly or the direction of the transducer assembly of the sonar assembly; and
a processor, the processor configured to:
  determine a direction of turn based on the user activity detected by the user input assembly;
  generate a turning input signal, the turning input signal being an electrical signal indicating the direction of turn; and
  direct one of the steering actuator of the trolling motor assembly or the directional actuator of the sonar assembly, via the turning input signal, to rotate the direction of one of the propulsion motor or the transducer assembly, respectively, in the direction of turn based on the turning input signal,
wherein the trolling motor assembly includes an autopilot navigation assembly configured to operate the steering actuator of the trolling motor assembly independently of receiving the turning input signal from the processor, such that the autopilot navigation system is capable of operating the steering actuator of the trolling motor assembly simultaneously to the processor directing the directional actuator of the sonar assembly to rotate the direction of the transducer assembly.

* * * * *